(12) United States Patent
Barr

(10) Patent No.: US 11,754,154 B2
(45) Date of Patent: Sep. 12, 2023

(54) MECHANICAL LINKAGE

(71) Applicant: 5Bar Pty Ltd., Toronto (AU)

(72) Inventor: Michael Robert Barr, Griffith (AU)

(73) Assignee: 5BAR PTY LTD., Toronto (AU)

( * ) Notice: Subject to any disclaimer, the term of this patent is extended or adjusted under 35 U.S.C. 154(b) by 0 days.

(21) Appl. No.: 17/271,113

(22) PCT Filed: Aug. 28, 2019

(86) PCT No.: PCT/AU2019/050913
§ 371 (c)(1),
(2) Date: Feb. 24, 2021

(87) PCT Pub. No.: WO2020/041833
PCT Pub. Date: Mar. 5, 2020

(65) Prior Publication Data
US 2021/0254689 A1 Aug. 19, 2021

(30) Foreign Application Priority Data
Aug. 30, 2018 (AU) .................................. 2018903202

(51) Int. Cl.
*F16H 21/06* (2006.01)
*F16H 21/12* (2006.01)
(Continued)

(52) U.S. Cl.
CPC ............. *F16H 21/12* (2013.01); *B62M 15/00* (2013.01); *B62M 21/00* (2013.01); *F16H 21/06* (2013.01)

(58) Field of Classification Search
CPC ........ F16H 21/12; F16H 21/14; B62M 21/00; B62M 15/00; F16D 41/24; F16D 41/08;
(Continued)

(56) References Cited

U.S. PATENT DOCUMENTS 3,868,860 A * 3/1975 Ishimi .................... F16H 29/12
74/63
4,179,943 A * 12/1979 Gamba .................. F16H 33/08
74/64

(Continued)

FOREIGN PATENT DOCUMENTS

CN 1844707 A 10/2006
GB 1420471 A 1/1976

OTHER PUBLICATIONS

International Search Report and Written Opinion dated Oct. 24, 2019 for International Patent Application No. PCT/AU2019/050913, 12 pages.

*Primary Examiner* — Gregory Robert Weber
(74) *Attorney, Agent, or Firm* — Morgan, Lewis & Bockius LLP

(57) ABSTRACT

A linkage system is disclosed that is suitable for connecting an input shaft and an output shaft. The linkage system has a wide variety of applications, with non-limiting examples disclosed including a hinge for a door or gate, and a hub for a bicycle or similar. The linkage system comprises a first member having an input location fixedly connected to the input shaft, a second member having an input location pivotally connected to an output location of the first member, a third member having an input location pivotally connected to an output location of the second member, and a fourth member having an input location pivotally connected to an output location of the third member and having an output location fixedly connected to the output shaft. The linkage system has an engaged mode of operation whereby rotation of the input shaft causes corresponding rotation of the output shaft, and a disengaged mode of operation whereby the input shaft can be rotated independently of the output shaft.

16 Claims, 14 Drawing Sheets

(51) Int. Cl.
*B62M 15/00* (2006.01)
*B62M 21/00* (2006.01)

(58) Field of Classification Search
CPC ... F16D 45/00; F16D 3/10; F16D 3/16; F16D 3/60; F16D 3/62
See application file for complete search history.

(56) References Cited

U.S. PATENT DOCUMENTS

| | | | |
|---|---|---|---|
| 5,362,015 A | 11/1994 | Derrien et al. | |
| 10,137,963 B2* | 11/2018 | Niki | F16D 21/08 |
| 2005/0230952 A1* | 10/2005 | Bless | B62D 1/20 |
| | | | 280/771 |
| 2010/0122593 A1* | 5/2010 | Jeong | F16D 3/04 |
| | | | 74/11 |
| 2015/0282355 A1* | 10/2015 | Wang | G06F 1/16 |
| | | | 74/63 |

* cited by examiner

SECTION 2-2

SECTION 3-3

MECHANICAL LINKAGE

CROSS REFERENCE TO RELATED APPLICATIONS

This application is a U.S. National Phase of International Application No. PCT/AU2019/050913 filed on Aug. 28, 2019, which claims the benefit of Australian Patent Application No. 2018903202 filed Aug. 30, 2018 entitled "Mechanical Linkage", each of which is incorporated by reference herein in its entirety.

TECHNICAL FIELD

The present invention generally relates to a system for mechanically connecting shafts or similar devices for cooperative and/or relative rotation.

BACKGROUND

Systems for mechanically connecting shafts have been known for centuries, with a broad range of applications throughout industry. The various forms of known gearboxes, drivetrains and other linkages each have their own advantages and disadvantages that often make them suitable for a specific purpose.

In some applications, it is desirable to provide a means for connecting and disconnecting the shafts. For example, it may be useful to connect the shafts when power is being provided to one shaft so that it is transferred to the other shaft, but to then quickly and easily disconnect the shafts when power is not being provided, to prevent losses or damage to power equipment, for example.

A ratchet system is well known, but only allows disconnection when relative rotation occurs in a particular direction. Other systems that are more controllable typically involve high losses in the power transfer, are difficult to engage and disengage, and/or are overly complicated and prone to failure.

In these or other applications, it is also desirable to bias or control the relative rotation between the shafts. For example, it may be useful to allow the shafts to rotate freely with respect to one another when disconnected, but to still allow some level of controlled rotation to one another when connected.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

SUMMARY

According to one example aspect, there is provided a linkage system that connects an input shaft and an output shaft, the linkage system including: a first member having an input location fixedly connected to the input shaft; a second member having an input location pivotally connected to an output location of the first member; a third member having an input location pivotally connected to an output location of the second member; and a fourth member having an input location pivotally connected to an output location of the third member and having an output location fixedly connected to the output shaft.

Preferably, the linkage system has an engaged mode of operation whereby rotation of the input shaft causes corresponding rotation of the output shaft. In one form, when the linkage system is in the engaged mode of operation, the pivotal connection between the first member and the second member, and the pivotal connection between the third member and the fourth member, are proximal to one another, while the pivotal connection between the second member and the third member is moved so that it is not collinear with the input shaft and the output shaft.

Also preferably, the linkage system has a disengaged mode of operation whereby the input shaft can be rotated independently of the output shaft. In one form, when the linkage system is in the disengaged mode of operation, the input shaft, the pivotal connection between the second member and the third member, and the output shaft, are collinear.

In other particular, but non-limiting, example forms: the linkage system further includes a device that controls the mode of operation of the linkage system; and the device controls the mode of operation by rotating the second member relative to the first member.

In another form, the device is mechanically operated automatically by the rotation of the input shaft. In one example form, the device includes a torsion spring that is configured to be tensioned by rotation of the first member while the linkage system is in the disengaged mode, the tension increasing until the torsion spring causes the linkage system to move to the engaged mode, the tension in the torsion spring being released when the linkage system is in the engaged mode.

In another example form, the device includes a stop that abuts a protrusion on the second member at a point during rotation of the input shaft when in the disengaged mode, wherein further rotation of the input shaft causes the linkage system to move to the engaged mode. Preferably, rotation of the second member relative to the first member is biased by a torsion spring.

In another particular, but non-limiting, example form, the input shaft and/or the output shaft includes a tube portion that forms a housing for at least part of the linkage system.

According to another example aspect, there is provided a linkage system that connects an input shaft and an output shaft, the linkage system including: a first member having an input location fixedly connected to the input shaft; a second member having an input location pivotally connected to an output location of the first member; a third member having an input location pivotally connected to an output location of the second member; and a fourth member having an input location pivotally connected to an output location of the third member and having an output location fixedly connected to the output shaft, wherein a mode of operation of the linkage system is controlled by a device that moves the second member relative to the first member.

Preferably, the device is operated by a control system connected to an actuator. In other particular, but non-limiting, example forms: the actuator is pneumatically operated; the actuator is hydraulically operated; the actuator is electrically operated; and the linkage system does not include a ratchet. In yet another example form, the actuator is mechanically operated.

In another example form, a time averaged ratio of the output shaft rotation to the input shaft rotation somewhere in the range of 0 to 1 is obtained by periodically alternating between modes of operation. In yet another example form, the fourth member includes stops to limit the position of the pivotal connection between the second member and the third member relative to the fourth member. In yet another example form, the first member includes stops to limit the position of the pivotal connection between the second member and the third member relative to the first member.

According to yet another optional aspect, there is provided a hinge for a door or gate, comprising a linkage system according to any one of the preceding claims.

According to yet another optional aspect there is provided a hub for a wheel, including a linkage system substantially as herein described. Such a wheel may be suited for a bicycle, car, truck, train or any other relevant vehicle.

According to yet another optional aspect there is provided a machine, including collinear shafts connected by a linkage system substantially as herein described.

BRIEF DESCRIPTION OF FIGURES

Example embodiments should become apparent from the following description, which is given by way of example only, of at least one preferred but non-limiting embodiment, described in connection with the accompanying figures, wherein.

DETAILED DESCRIPTION

Figure 1:
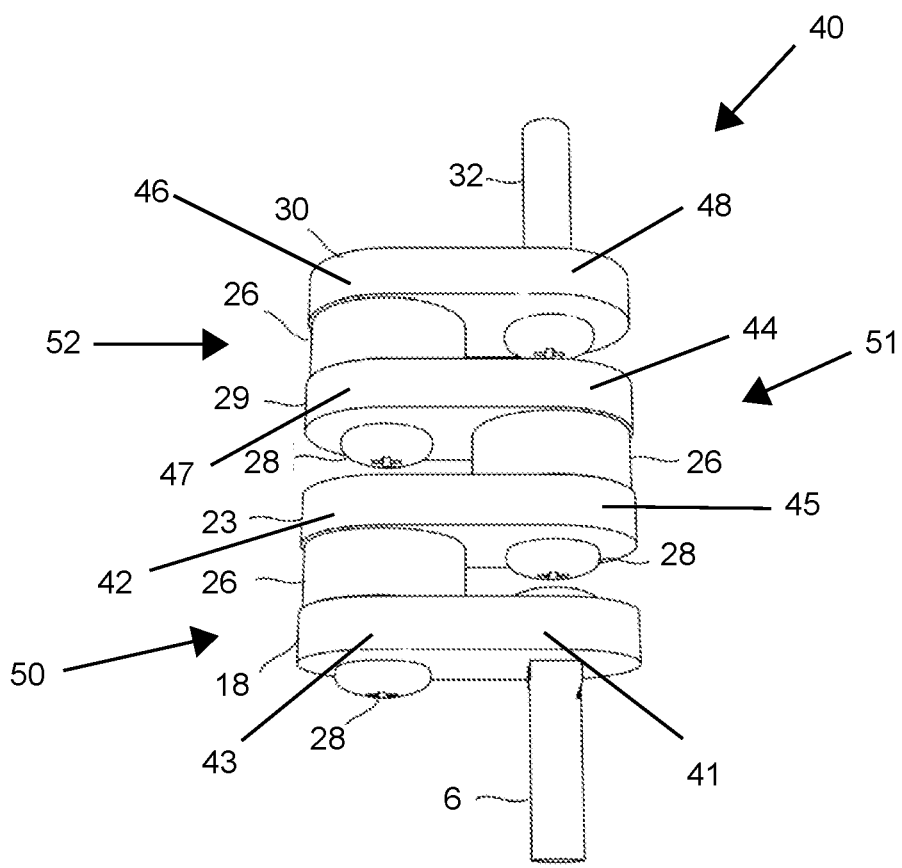
FIG. 1 illustrates an angled front view of a linkage system according to a first embodiment of the invention.

The following modes, given by way of example only, are described in order to provide a more precise understanding of the subject matter of a preferred embodiment or embodiments.

In the Figures, incorporated to illustrate features of an example embodiment, like reference numerals are used to identify like parts throughout the Figures.

An example embodiment of a linkage system for connecting an input shaft and an output shaft according to the present invention will now be described with reference to FIG. 1.

Throughout the specification and the claims that follow, the term "shaft" is used in a broad sense to capture a wide range of structures. In particular, a shaft is intended to include any item that can be rotated about an axis, including but not limited to, elongate solid members, shorter and/or wider solid members, and hollow members such as tubes or the like in a range of lengths, widths and/or shapes. Shafts may also have attachments or other protuberances, such as sprockets, threads, and/or non-symmetrical projections such as tabs or flanges.

Referring to FIG. 1, a first embodiment of a linkage system 40 is shown that connects an input shaft 6 and an output shaft 32. A first member 18 is fixed at an input location 41 to the input shaft 6, so that the first member 18 and the input shaft 6 rotate together.

A second member 23 is pivotally connected at an input location 42 to an output location 43 of the first member 18. A spacer 26 is provided to allow relative rotation of the first member 18 and second member 23 without any interference. In alternative embodiments of the invention, however, it will be appreciated that other suitable means may be used in place of the spacer 26, such as a flanged bush or bearing, or the appropriate members may include a flange or other protrusion to carry out the same function. In yet other alternative embodiments, the spacer 26 may simply be deleted, which may increase friction, but that may not be an issue depending on the particular application of the linkage. Depending on the means by which the members 18, 23 are connected, however, there may simply be a small gap without the need for a spacer 26.

A third member 29 is pivotally connected at an input location 44 to an output location 45 of the second member 23. A spacer 26 is provided to allow relative rotation of the second member 23 and third member 29 without any interference, but again as discussed above there may be alternatives to the spacer 26 in other embodiments.

A fourth member 30 is pivotally connected at an input location 46 to an output location 47 of the third member 29. A spacer 26 is provided to allow relative rotation of the third member 29 and fourth member 30 without any interference, but again as above there may be alternatives to the spacer 26 in other embodiments. The fourth member 30 is fixed at an output location 48 to the output shaft 32.

Each of the pivot connections includes a fastener 28 that connects the appropriate members while allowing relative rotation. In alternative embodiments of the invention, however, it will be appreciated that other suitable means may be used instead of the fastener 28, such as a press-fit rod or bush/bearing arrangement, for example. Where parts are fixed relative to one another, such as the input shaft 6 and the first member 18 for example, these may be formed as a single piece in some embodiments.

The connection between the first member 18 and second member 23 may be referred to as the first pivot 50, the connection between the second member 23 and the third member 29 may be referred to as the second pivot 51, and the connection between the third member 29 and the fourth member 30 may be referred to as the third pivot 52.

When the fasteners 28 of the first pivot 50 and the third pivot 52 are collinear, these connections may be considered aligned. In this position, the second pivot 51 may be moved so that it is no longer positioned between the input shaft 6 and the output shaft 32. When the second pivot 51 is moved in this way, this has the effect of locking the input shaft 6 and the output shaft 32 so that they cannot rotate relative to one another.

This configuration may be considered an engaged mode of operation, whereby rotation of the input shaft 6 causes corresponding rotation of the output shaft 32. In the engaged mode of operation, the first pivot 50 and the third pivot 52 remain proximal to one another.

When the second pivot 51 is returned to the position between the input shaft 6 and the output shaft 32, the input shaft 6 and the output shaft 32 are no longer locked. Instead, relative rotation of the second member 23 and the third member 29 can occur, which in turn allows relative rotation of the input shaft 6 and the output shaft 32.

This configuration may be considered a disengaged mode of operation, whereby the input shaft 6 can be rotated independently of the output shaft 32. For example, the input shaft 6, first member 18, and second member 23 may all rotate together, while the third member 29, fourth member 30, and output shaft 32 remain stationary. When the linkage system 40 is in the disengaged mode of operation, the input shaft 6, the second pivot 51 and the output shaft 32 are collinear.

Example embodiments of the invention configured for use in particular applications will now be described, where FIGS. 1-10 show various embodiments of a hub for a bicycle or the like and FIGS. 11-20 show a hinge for a door with an integrated closing mechanism. It will be appreciated that these are just some specific applications of the linkage system, with many other uses being possible and considered to fall within the scope of the invention.

Figure 2:
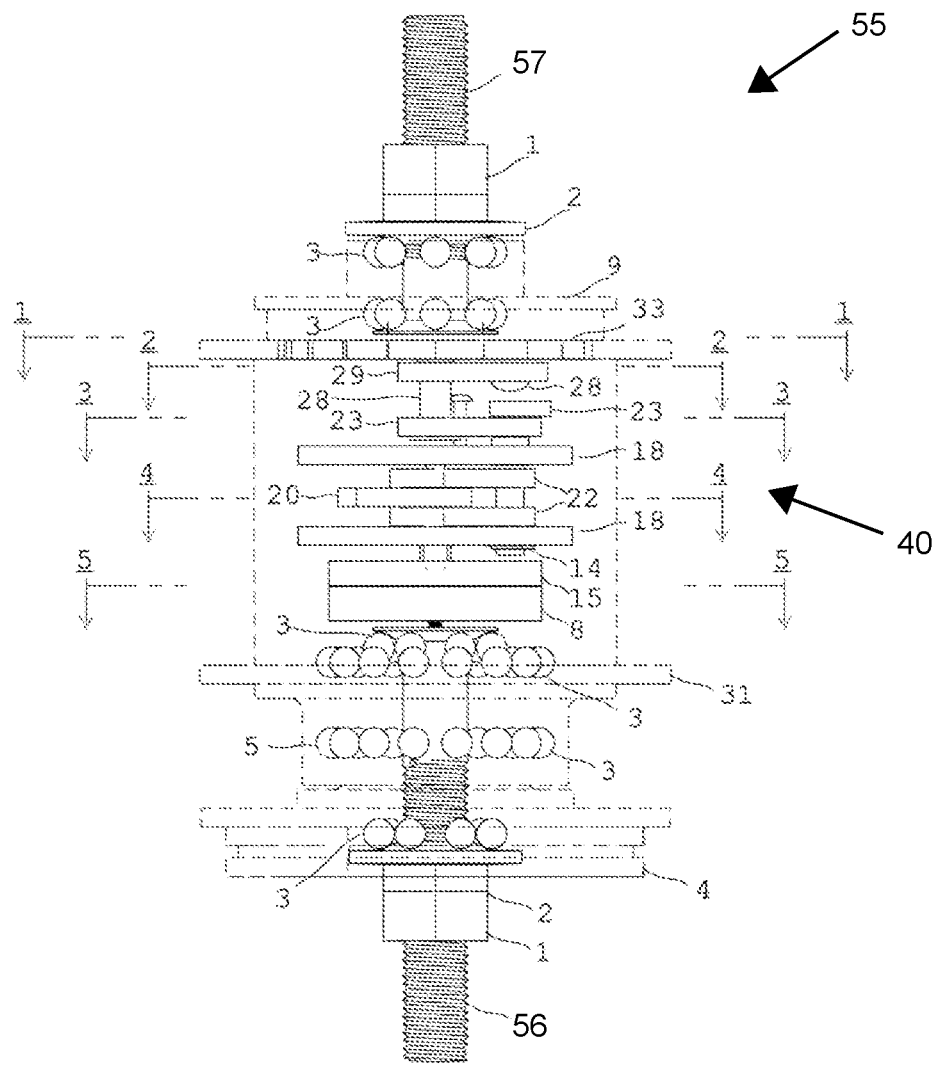
FIG. 2 illustrates a front view of a linkage system according to a second embodiment of the invention.
Figure 3:
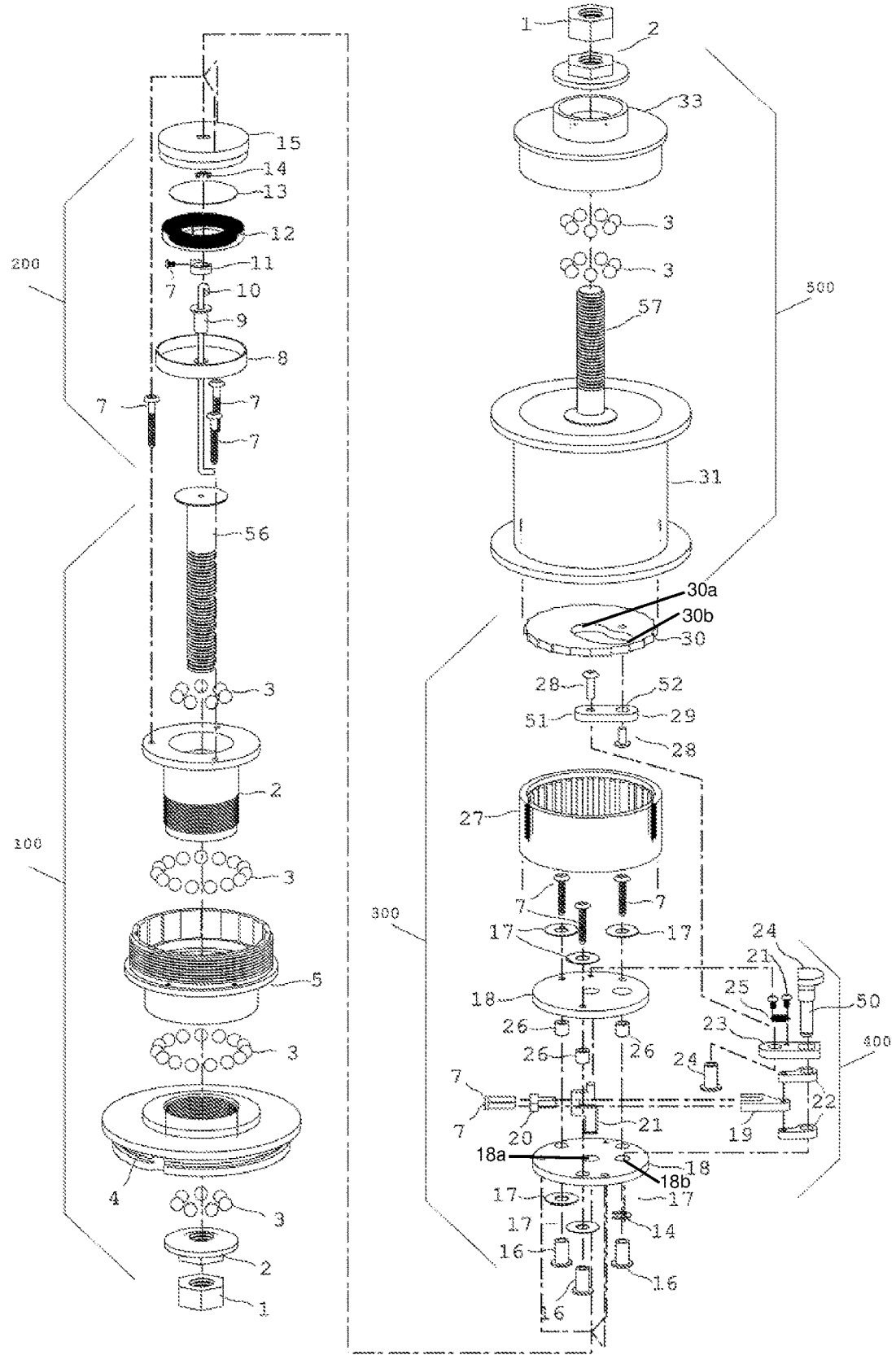
FIG. 3 illustrates an exploded view of the linkage system from FIG. 2.
Figure 4:
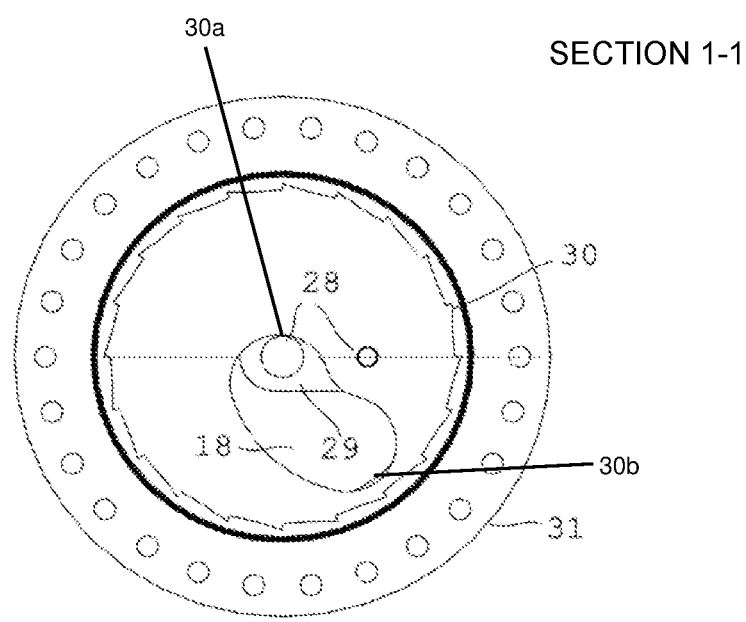
FIG. 4 illustrates a sectional view of the linkage system from FIG. 2 taken through Section 1-1.
Figure 5:
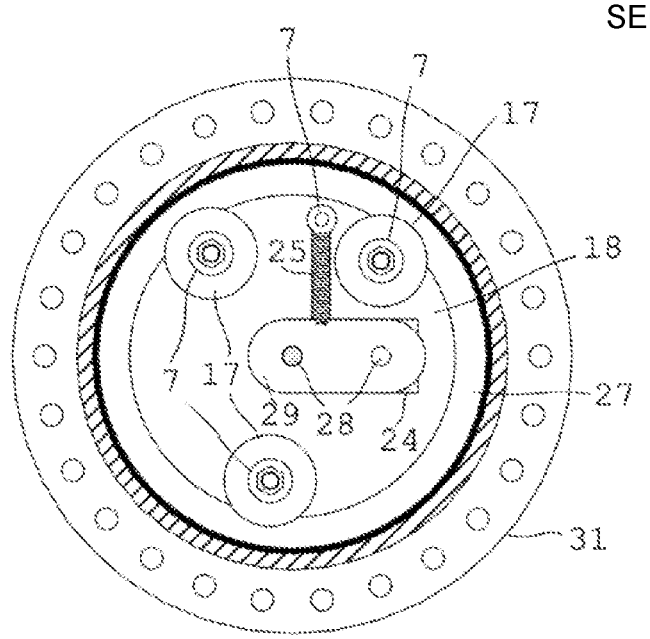
FIG. 5 illustrates a sectional view of the linkage system from FIG. 2 taken through Section 2-2.
Figure 6:
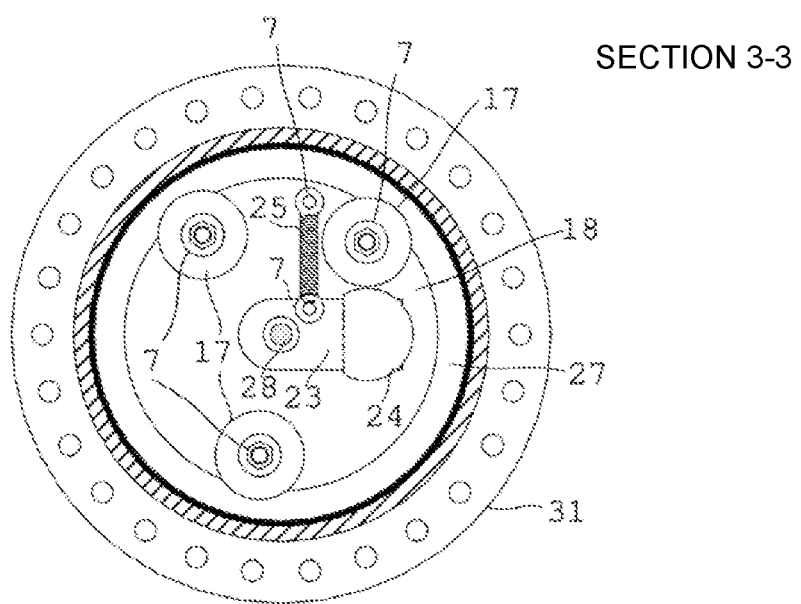
FIG. 6 illustrates a sectional view of the linkage system from FIG. 2 taken through Section 3-3.
Figure 7:
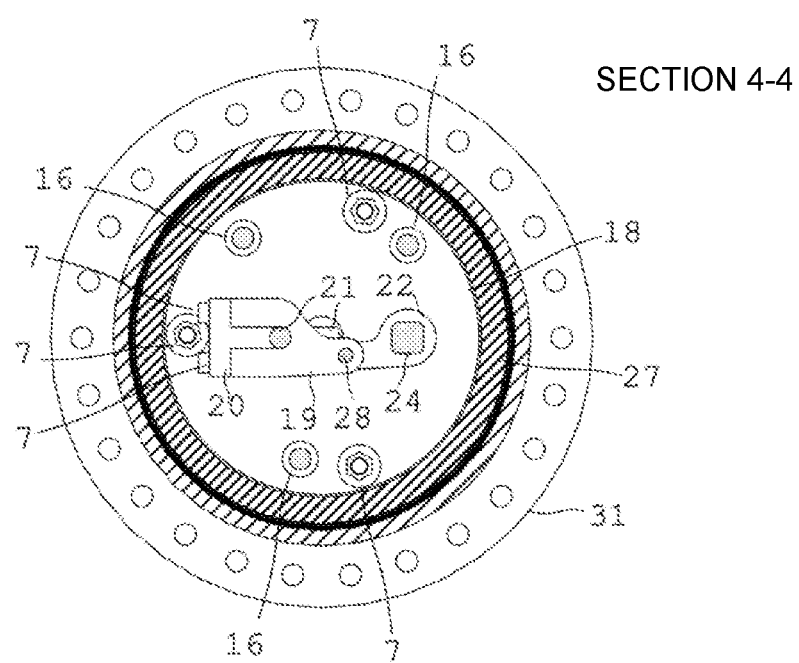
FIG. 7 illustrates a sectional view of the linkage system from FIG. 2 taken through Section 4-4.
Figure 8:
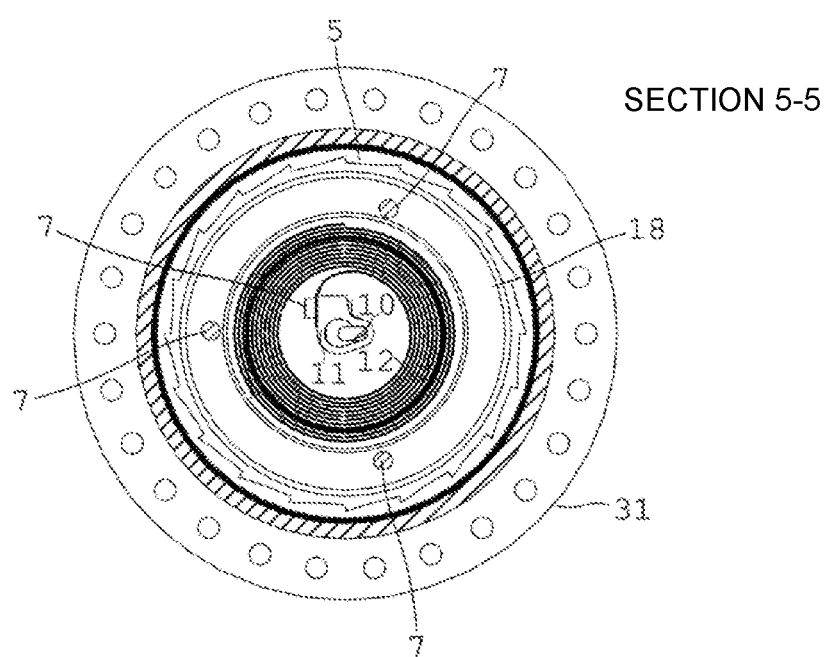
FIG. 8 illustrates a sectional view of the linkage system from FIG. 2 taken through Section 5-5.

Referring to FIG. 2, a second embodiment of the invention is shown in the form of a hub 55, which is suitable for use in a bicycle wheel. In alternative embodiments of the invention, however, it will be appreciated that the hub may be fitted in a wheel for a different vehicle, such as a car, truck, train or another similar application. A linkage system 40 of a similar general layout to that of the first embodiment is included inside the hub 55.

The hub 55 is supported during use by a first axle 56 and a second axle 57, which are each mounted to a frame or other supporting device using a nut 1, bearing race 2 and ball bearings 3.

The input shaft 6 from the first embodiment is now in the form of a sprocket mounting 4, which makes up part of an input subassembly 100. The sprocket mounting 4 is connected to a linkage system subassembly 300 by the bearing race 2 that is threaded into the sprocket mounting 4. Fasteners 7 in turn connect the bearing race 2 to the first member 18, which can be seen to be made up of two plates separated and connected by fasteners 7, washers 17, spacers 26 and rivet nuts 16.

A second member subassembly 400 includes a second member axle 24 which pivotally connects the second member 23 to the first member 18. The third member 29 is in turn connected to the second member 23 by the fastener 28, and the third member 29 is connected to the fourth member 30.

The fourth member 30 is in the form of a plate 30 that is fixed inside the hub body 31. The hub body 31 takes the place of the output shaft 32 from the first embodiment, and also connects to a first endcap 5 and a second endcap 33. A bearing 27 allows relative rotation of the hub body 31 and the sprocket mounting 4.

This second embodiment of the linkage system 40 also includes a device that controls the mode of operation of the linkage system 40. The device controls the mode of operation by rotating the second member 23 relative to the first member 18. The device is mechanically operated automatically by the rotation of the input shaft, which in this embodiment takes the form of the sprocket mounting 4.

The device is made up of a ratchet subassembly 200 and part of the second member subassembly 400. The ratchet subassembly 200 includes a torsion spring 12 that is configured to be tensioned by rotation of the first member 18 while the linkage system 40 is in the disengaged mode. The tension increases until the torsion spring 12 causes the linkage system 40 to move to the engaged mode. The tension in the torsion spring 12 is then able to be released while the linkage system 40 is in the engaged mode.

The second member 23 connects through link arms 22, a crank rod 19 and a crank rod end cap 20 to a crank 21. It will be appreciated that in alternative embodiments, however, an eccentric, electric motor, solenoid or pneumatic/hydraulic control could be used instead. The crank 21 is fixedly connected to a barrel 15 and barrel cap 8, with a circlip 14 helping secure the components together.

Inside the barrel is the torsion spring 12 fixedly connected at one end to the inside of the barrel 15 by a suitable means such as friction, glue, screw or capture. The other end of the torsion spring 12 is fixedly connected to an internally toothed drum 11. A pawl 10 inside the drum 11 passes through a sleeve 9 and is fixedly connected to the frame holding the hub in place. A domed disk 13 helps to package the torsion spring 12 in the barrel 15.

Consequently, rotating the first member 18 will also cause the second member 23 to rotate and wind the torsion spring 12 against the pawl 10. The torsion spring 12 continues to be wound up until the second member 23 and the third member 29 become parallel. In this configuration, they no longer constrain the second pivot 51 to be collinear with the axles 56, 57. So, at this point, the second member 23 is thrown sideways by the torsion spring 12, thereby changing the mode of the linkage assembly 40.

With the second pivot 51 no longer constrained to be collinear with the axles 56, 57, the torsion spring 12 unwinds, thereby turning the crank 21 which rotates the second member 23 about the first pivot 50 with the first member 18, thereby also rotating the third member 29 about the third pivot 52 with the fourth member 30.

The sum of forces applied by the third member 29 to the second member 23 tends to rotate the second pivot back to be collinear with the axles 56, 57. This returns the linkage system 40 to the disengaged condition. A return spring 25 may also be provided to ensure this happens. The fourth member 30 also includes an opening that effectively forms stops 30a and 30b to limit the position of the third pivot 52 relative to the fourth member.

A time period of deflection is expected to be constant as the torsion spring 12 coupled to the second member 23 forms a harmonic oscillator, similar to that found in an analogue watch. At slow speeds of the output shaft, the input shaft will rotate only a short distance while engaged. As the period of deflection is the same for higher speeds as for lower speeds, it follows that torque will be applied over a longer distance, thereby automatically adjusting the input to output ratio.

Figure 9:
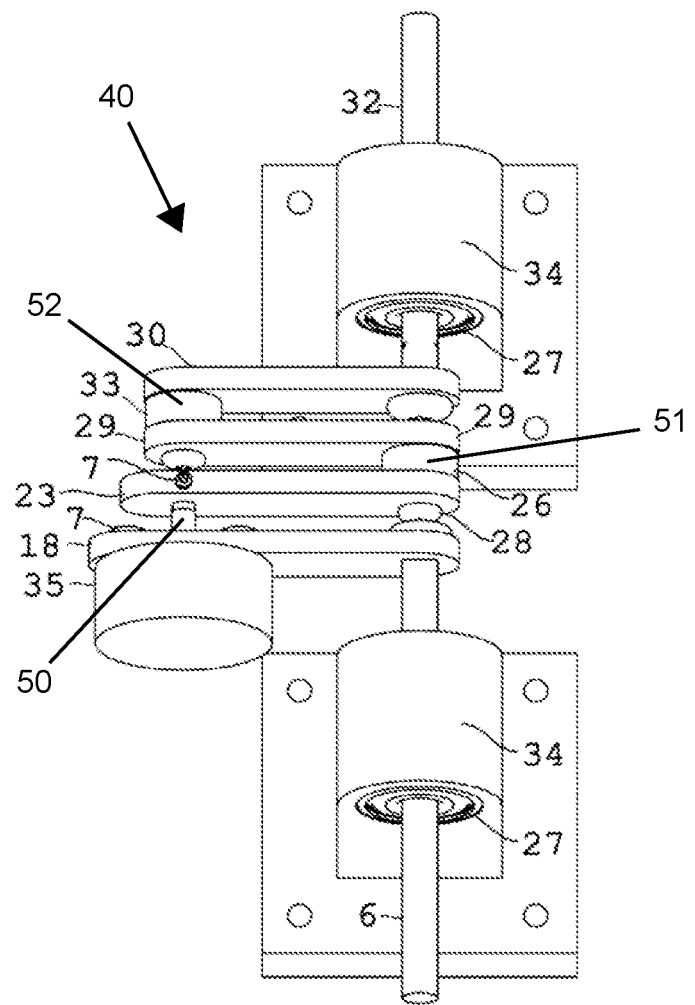
FIG. 9 illustrates an angled front view of a linkage system according to a third embodiment of the invention.

Referring to FIG. 9, a third embodiment of a linkage system 40 is shown. In this embodiment, the mode of operation of the linkage system 40 is controlled by an electric motor 35 that moves the second member 23 relative to the first member 18. It will be appreciated that this electric motor 35 will typically be connected to a control system, however while the connections and/or control system are not shown for clarity purposes these would be readily understood by those skilled in the art.

It will also be appreciated that in various alternative embodiments the electric motor 35 may be replaced with any other suitable actuator, such as but not limited to an actuator that is pneumatically operated or hydraulically operated.

The system of FIG. 9 is a simplified form of the invention, as the ratchet, springs and other mechanical components can be eliminated. It will be appreciated that such an embodiment has a very wide application across industry to virtually any machine where shafts are required to be coupled and decoupled.

Figure 10:
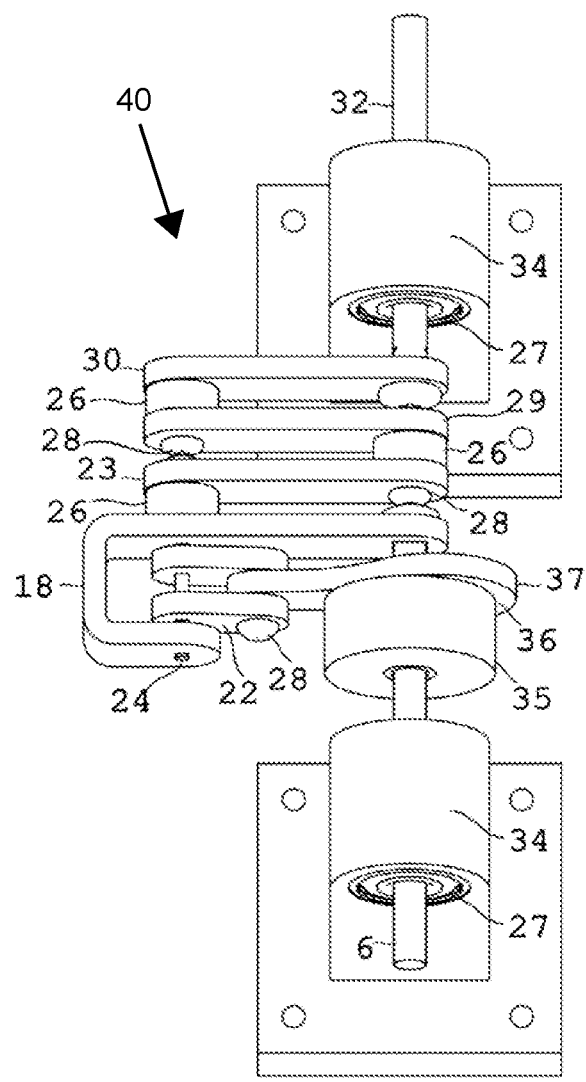
FIG. 10 illustrates an angled front view of a linkage system according to a fourth embodiment of the invention.
Figure 12:
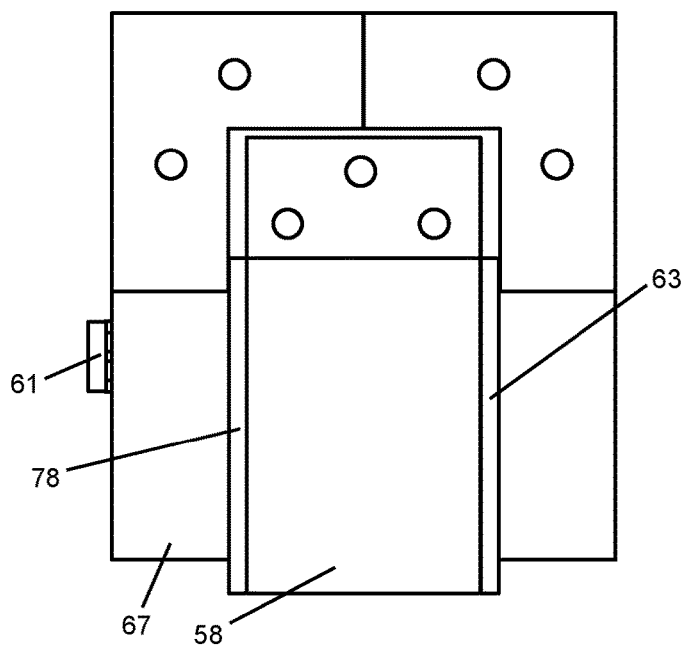
FIG. 12 illustrates a plan view of the linkage system from FIG. 11.
Figure 13:
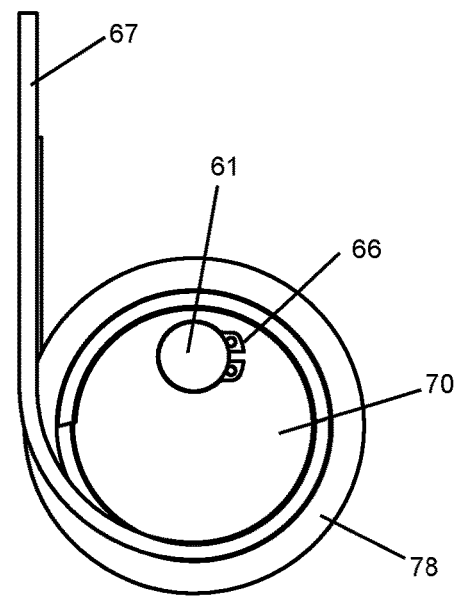
FIG. 13 illustrates a left view of the linkage system from FIG. 11.
Figure 14:
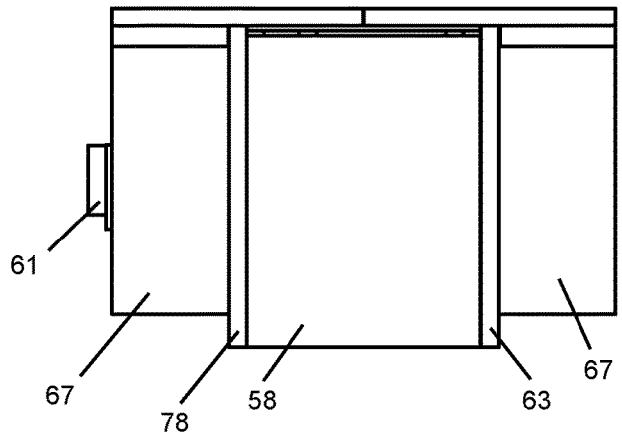
FIG. 14 illustrates a front view of the linkage system from FIG. 11.
Figure 11:
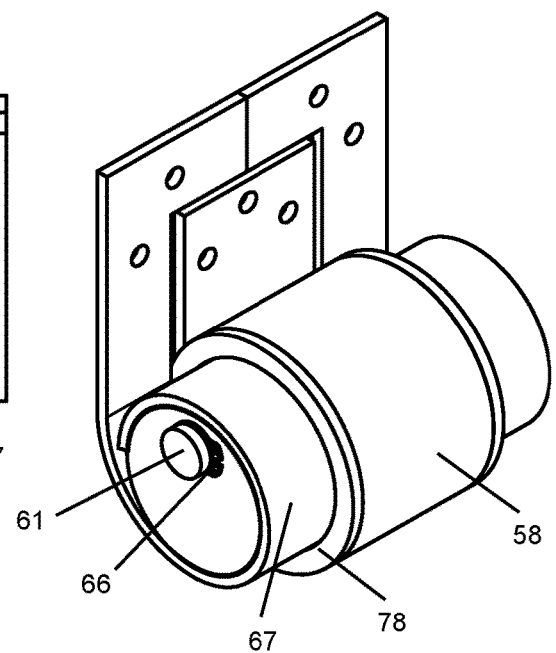
FIG. 11 illustrates an isometric view of a linkage system according to a fifth embodiment of the invention.
Figure 15:
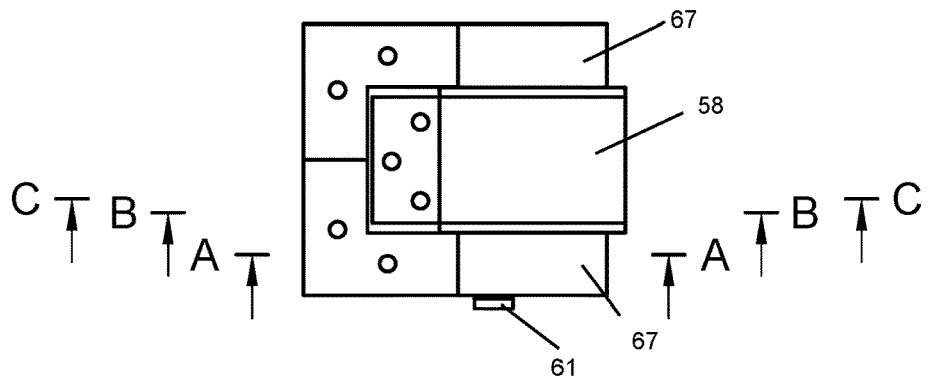
FIG. 15 illustrates a plan view of the linkage system from FIG. 11.
Figure 16:
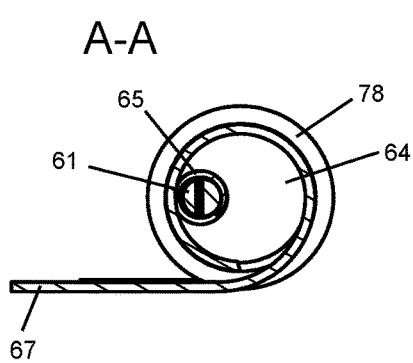
FIG. 16 illustrates a sectional view of the linkage system from FIG. 11 taken through Section A-A as shown in FIG. 15.
Figure 17:
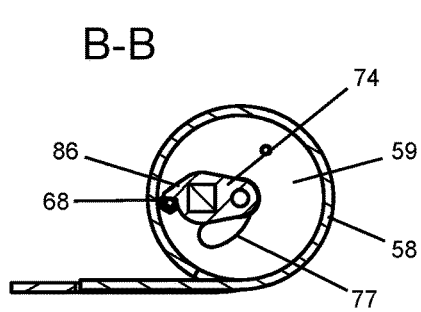
FIG. 17 illustrates a sectional view of the linkage system from FIG. 11 taken through Section B-B as shown in FIG. 15.
Figure 18:
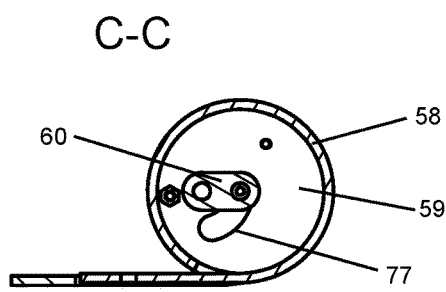
FIG. 18 illustrates a sectional view of the linkage system from FIG. 11 taken through Section C-C as shown in FIG. 15.
Figure 19:
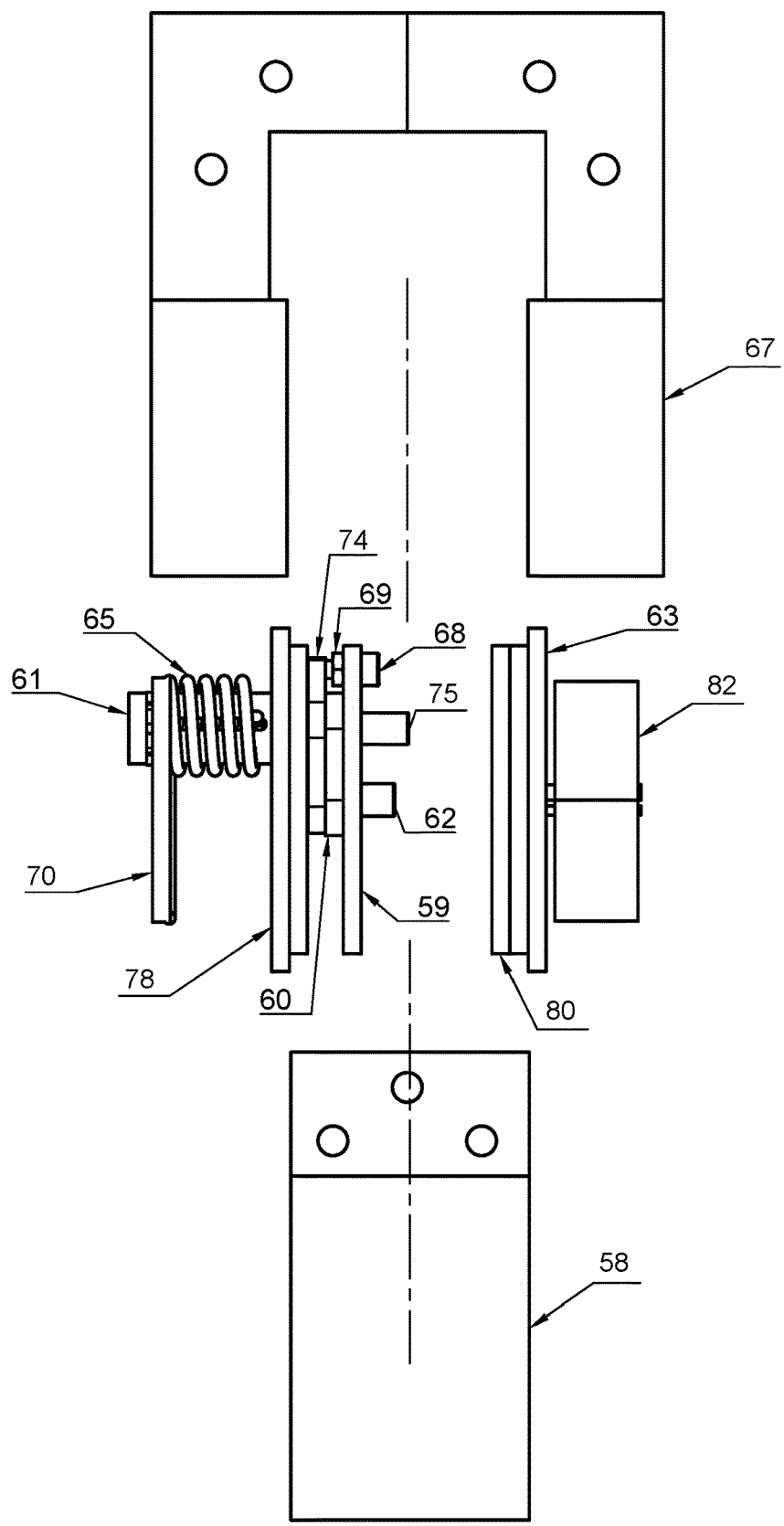
FIG. 19 illustrates a front view of the linkage system from FIG. 11 when partially disassembled.

Referring to FIG. 10, a fourth embodiment of a linkage system 40 is shown. This embodiment includes the electric motor 35 in line with the input shaft 6 and bearing housing 34. The electric motor instead is linked to the second member 23 by an eccentric rod 37 and arms 22.

Referring to FIGS. 11 to 20, a fifth embodiment of the invention is shown in the form of a hinge 90, made up of an inner housing 58 and an outer housing 67 that are operatively connected to one another by a linkage system. In use, the inner housing 58 may be connected to a stationary object, such as a fence or door frame, while the outer housing is connected to a gate or a door, or vice versa. Of course, it will be appreciated that the hinge can be used in a wide variety of applications.

Figure 20:
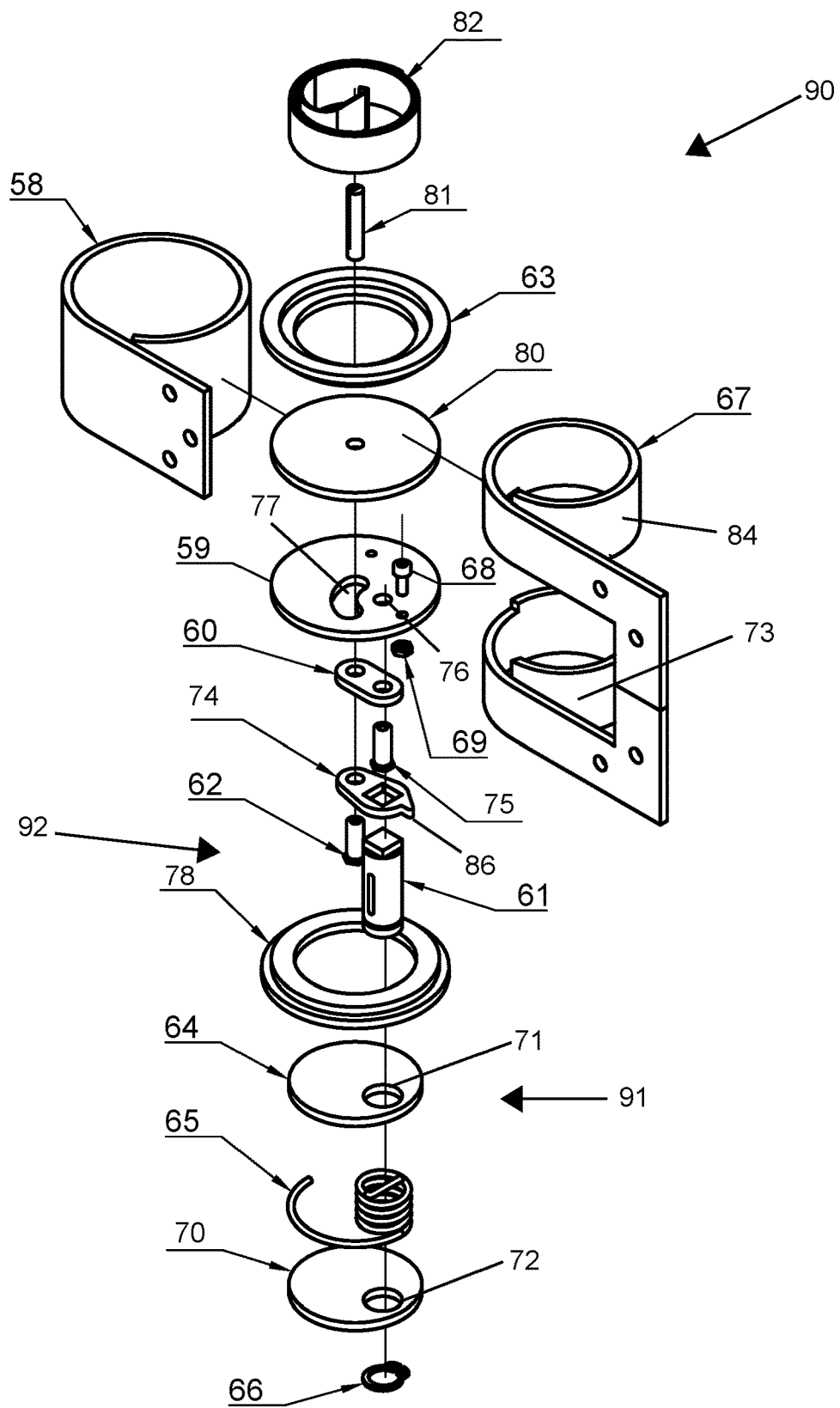
FIG. 20 illustrates an exploded view of the linkage system from FIG. 11.

Referring to FIG. 20, an upper first member 64 is in the form of a disc with an off-centre hole 71, and a lower first member 70 is of a similar form with an off-centre hole 72. Together, these components form the first member 91. The upper 64 and lower 70 first members when assembled are fitted and fixed within a lower portion 73 of the outer housing 67 and have a torsion spring 65 sandwiched between. As such, the outer housing 67 may be considered the input shaft.

A second member 92 is formed by a second member shaft 61 and a second member cam 74 that are fixed to one another. The second member shaft 61 when assembled can rotate within the off-centre holes 71, 72 of the first member 91, thereby forming a first pivot. The second member shaft 61 is held in place by a circlip 66 and is rotationally fixed to the torsion spring 65. However, it will be appreciated that circlip 66 may not be necessary if other components are already fixed in appropriate ways. The torsion spring 65 when assembled abuts the outer housing 67, thereby providing a rotational bias to the second member 92.

A third member 60 is pivotally connected to the second member cam 74 by a first pin 62, thereby forming a second pivot. An opposite end of the third member 60 is connected to a fourth member 59 by a second pin 75, thereby forming a third pivot.

The fourth member 59 includes an off-centre hole 76 to which the second pin 75 connects, and a fastener 68 that extends through another off centre hole and is held in place by a nut 69. The fourth member 59 also includes an arcuate slot 77, through which the first pin 62 passes. The fourth member 59 is fitted and fixed within the inner housing 58, so that the inner housing 58 may be considered the output shaft.

In an alternative embodiment, the first pin 62 may be shorter so that it does not extend beyond the third member 60. In such an embodiment, the arcuate slot 77 would no longer be required.

Finally, returning to the embodiment in the Figures, an upper bush 63 and a lower bush 78 sandwich the second 92, third 60, and fourth 59 members together, which are all fitted within the inner housing 58 when assembled. The bushes 63, 78 allowing the inner housing 58 and the outer housing 67 to rotate relative to one another.

Below the upper bush 63 there is also fitted a plate 80, which is fixed within the inner housing 58. A slotted bar 81 is fixed to the plate 80 and extends through the upper bush 63 to a torsion spring 82, an inner end of which fits within the slot of the bar 81 so that they are also rotationally fixed to one another. An outer end of the torsion spring 82 is fixed to an upper portion 84 of the outer housing 67. Therefore, the torsion spring 82 directly provides a rotational bias between the inner housing 58 and the outer housing 67.

The function of the hinge 90 when assembled will now be described. The linkage within the hinge 90 has a disengaged mode of operation, or "freewheel phase", where the input shaft and output shaft, in this case the inner housing 58 and the outer housing 67, can be rotated somewhat independently of one another. The torsion spring 82 does provides a bias in this phase, however it would also be possible in an alternative embodiment to remove the torsion spring 82.

In the freewheel phase, the first member 91 and the second member 92 rotate with the outer housing 67, while the third member 60 and the fourth member 59 rotate with the inner housing 58. That is, the relative rotation within the linkage occurs at the second pivot, where the second member cam 74 connects to the third member 60 by the first pin 62.

At some point during the rotation, a protrusion 86 on the second member cam 74 contacts the fastener 68, which begins a "transition phase". During this phase, further rotation of the outer housing 67 causes the second member 92 to rotate relative to the first member 91. As a result, the third member 60 also rotates relative to the fourth member 59, with the first pin 62 moving along the slot 77 towards an outer edge of the fourth member 59. This rotation is resisted by the torsion spring 65, so that the relative movement of the inner 58 and outer 67 housings is slowed.

When the pin 62 reaches the outer end of the arcuate slot 77 it is prevented from moving any further, which in turn prevents any further rotation of the inner housing 58 in relation to the outer housing 67. This point may be considered the "engaged phase" as the housings 58, 67 are effectively locked, with no further rotation possible.

In the embodiment shown, the locked phase is reached after about 45° of rotation of the inner housing 58 relative to the outer housing 67 during the transition phase. Depending on various factors, such as sizes of components and/or tolerances and wear of parts, for example, the pin 62 may not reach the outer end of the arcuate slot 77, due to the locked phase being reached prior to this point. Similarly, in embodiments where the pin 62 is shorter and the arcuate slot 77 is not present, the second member cam 74 and/or third member 60 may contact the inner housing 58, or the locked phase may be reached prior to this point.

The hinge 90 can be arranged with a door so that the door is in an open position when the hinge is in the freewheel phase. The upper torsion spring 82 acts to bias the door towards a closed position. As the door moves towards the closed position under the action of the torsion spring 82 it will then enter the transition phase before it is completely closed. During the transition phase the lower torsion spring 65 acts to slow the closing of the door, softening the impact when the door reaches the fully closed position. The engaged phase may not quite be reached, or alternatively, may coincide with the door being fully closed.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer", "above" and "below", "input" and "output", and the like are used as words of convenience to provide reference points and are not to be construed as limiting terms.

Whilst the present invention has been described with reference to particular embodiments, it will be understood that many modifications will be apparent to those skilled in the art. All such variations and modifications should be considered to fall within the scope of the invention as broadly described and as claimed below.

Throughout this specification and the claims which follow, unless the context requires otherwise, the word "comprise", and variations such as "comprises" or "comprising", will be understood to imply the inclusion of a stated integer or step or group of integers or steps but not the exclusion of any other integer or step or group of integers or steps.

LIST OF PARTS 1 nut
2 bearing race
3 ball bearings
4 sprocket mounting
5 first endcap
6 input shaft
7 fastener
8 barrel cap
9 sleeve
10 pawl (ratchet)
11 internally toothed drum
12 torsion spring
13 domed disk
14 circlip
15 barrel
16 rivet nut
17 washer
18 first member
19 crank rod
20 crank rod endcap
21 crank
22 arm
23 second member
24 second member axle
25 return spring
26 spacers
27 bearing
28 fastener
29 third member
30 fourth member
31 hub body
32 output shaft
33 second endcap
34 bearing housing
35 electric motor
37 eccentric rod
40 linkage system (first embodiment)
41 first member input location
42 second member input location
43 first member output location
44 third member input location
45 second member output location
46 fourth member input location
47 third member output location
48 fourth member output location
50 first pivot
51 second pivot
52 third pivot
55 hub
56 first axle
57 second axle
58 inner housing
59 fourth member
60 third member
61 second member shaft
62 first pin
63 upper bush
64 upper first member
65 torsion spring
66 circlip
67 outer housing
68 fastener
69 nut
70 lower first member
71 hole in upper first member
72 hole in lower first member
73 lower portion of outer housing
74 second member cam
75 second pin
76 hole in fourth member
77 arcuate slot
78 lower bush
80 plate
81 slotted bar
82 torsion spring
84 upper portion of outer housing
86 protrusion
90 hinge
91 first member
92 second member The claims defining the invention are as follows:

1. A linkage system that connects an input shaft and an output shaft, the linkage system comprising:
    a first member having an input location fixedly connected to the input shaft;
    a second member having an input location pivotally connected to an output location of the first member;
    a third member having an input location pivotally connected to an output location of the second member; and
    a fourth member having an input location pivotally connected to an output location of the third member and having an output location fixedly connected to the output shaft,
    wherein the linkage system has an engaged mode of operation whereby rotation of the input shaft causes corresponding rotation of the output shaft,
    wherein when the linkage system is in the engaged mode of operation, the pivotal connection between the first member and the second member, and the pivotal con-nection between the third member and the fourth member, are proximal to one another, while the pivotal connection between the second member and the third member is moved so that it is not collinear with the input shaft and the output shaft, wherein the linkage system has a disengaged mode of operation whereby the input shaft can be rotated independently of the output shaft, and wherein when the linkage system is in the disengaged mode of operation, the input shaft, the pivotal connection between the second member and the third member, and the output shaft, are collinear.

2. The linkage system according to claim 1, further comprising a device that controls a mode of operation of the linkage system.

3. The linkage system according to claim 2, wherein the device controls the mode of operation by rotating the second member relative to the first member.

4. The linkage system according to claim 2, wherein the device is mechanically operated automatically by rotation of the input shaft.

5. The linkage system according to claim 4, wherein the device comprises a torsion spring that is configured to be tensioned by rotation of the first member while the linkage system is in a disengaged mode, the tension increasing until the torsion spring causes the linkage system to move to an engaged mode, the tension in the torsion spring being released when the linkage system is in the engaged mode.

6. The linkage system according to claim 4, wherein the device comprises a stop that abuts a protrusion on the second member at a point during rotation of the input shaft when in the disengaged mode, wherein further rotation of the input shaft causes the linkage system to move to the engaged mode.

7. The linkage system according to claim 6, wherein rotation of the second member relative to the first member is biased by a torsion spring.

8. The linkage system according to claim 1, wherein at least one of the input shaft and the output shaft comprises a tube portion that forms a housing for at least part of the linkage system.

9. A hinge for a door or gate, comprising the linkage system according to claim 1.

10. A linkage system that connects an input shaft and an output shaft, the linkage system comprising:
a first member having an input location fixedly connected to the input shaft;
a second member having an input location pivotally connected to an output location of the first member;
a third member having an input location pivotally connected to an output location of the second member; and
a fourth member having an input location pivotally connected to an output location of the third member and having an output location fixedly connected to the output shaft, wherein a mode of operation of the linkage system is controlled by a device that moves the second member relative to the first member, wherein the linkage system has an engaged mode of operation whereby rotation of the input shaft causes corresponding rotation of the output shaft, wherein when the linkage system is in the engaged mode of operation, the pivotal connection between the first member and the second member, and the pivotal connection between the third member and the fourth member, are proximal to one another, while the pivotal connection between the second member and the third member is moved so that it is not collinear with the input shaft and the output shaft, wherein the linkage system has a disengaged mode of operation whereby the input shaft can be rotated independently of the output shaft, and wherein when the linkage system is in the disengaged mode of operation, the input shaft, the pivotal connection between the second member and the third member, and the output shaft, are collinear.

11. The linkage system according to claim 10, wherein the device is operated by a control system connected to an actuator.

12. The linkage system according to claim 10, wherein a time averaged ratio of an output shaft rotation to an input shaft rotation somewhere in the range of 0 to 1 is obtained by periodically alternating between modes of operation.

13. The linkage system according to claim 10, wherein the fourth member comprises stops to limit the position of the pivotal connection between the second member and the third member relative to the fourth member.

14. The linkage system according to claim 10, wherein the first member comprises stops to limit the position of the pivotal connection between the second member and the third member relative to the first member.

15. A hub for a wheel, comprising the linkage system according to claim 10.

16. A machine, comprising collinear shafts connected by the linkage system according to claim 10.

* * * * *